US009567545B2

(12) United States Patent
Mizuki et al.

(10) Patent No.: US 9,567,545 B2
(45) Date of Patent: Feb. 14, 2017

(54) GREASE COMPOSITION FOR EV/HEV DRIVING MOTOR BEARING AND EV/HEV DRIVING MOTOR BEARING

(75) Inventors: Hironori Mizuki, Fujisawa (JP); Takeshi Maejima, Fujisawa (JP); Kenichi Iso, Yamato (JP); Kazunori Nakagawa, Yamato (JP); Yutaka Imai, Fujisawa (JP); Ryo Aida, Suzuka (JP)

(73) Assignees: NSK LTD., Tokyo (JP); KYODO YUSHI CO., LTD., Kanagawa (JP)

( * ) Notice: Subject to any disclaimer, the term of this patent is extended or adjusted under 35 U.S.C. 154(b) by 74 days.

(21) Appl. No.: 14/131,798

(22) PCT Filed: Jul. 27, 2012

(86) PCT No.: PCT/JP2012/069165
§ 371 (c)(1),
(2), (4) Date: Jan. 9, 2014

(87) PCT Pub. No.: WO2013/015413
PCT Pub. Date: Jan. 31, 2013

(65) Prior Publication Data
US 2014/0142012 A1    May 22, 2014

(30) Foreign Application Priority Data

Jul. 28, 2011  (JP) ................. 2011-165677

(51) Int. Cl.
| | |
|---|---|
| C10M 159/24 | (2006.01) |
| C10M 173/02 | (2006.01) |
| C10M 135/10 | (2006.01) |
| C10M 169/02 | (2006.01) |
| C10M 105/38 | (2006.01) |
| C10M 115/08 | (2006.01) |
| C10M 129/10 | (2006.01) |
| C10M 133/12 | (2006.01) |
| F16C 33/66 | (2006.01) |

(52) U.S. Cl.
CPC ......... *C10M 135/10* (2013.01); *C10M 105/38* (2013.01); *C10M 115/08* (2013.01); *C10M 129/10* (2013.01); *C10M 133/12* (2013.01); *C10M 169/02* (2013.01); *C10M 2203/1006* (2013.01); *C10M 2205/0285* (2013.01); *C10M 2207/026* (2013.01); *C10M 2207/0406* (2013.01); *C10M 2207/289* (2013.01); *C10M 2207/2825* (2013.01); *C10M 2207/2835* (2013.01); *C10M 2215/064* (2013.01); *C10M 2215/1026* (2013.01); *C10M 2219/046* (2013.01); *C10N 2220/022* (2013.01); *C10N 2230/02* (2013.01); *C10N 2230/06* (2013.01); *C10N 2230/08* (2013.01); *C10N 2240/02* (2013.01); *C10N 2250/10* (2013.01); *F16C 33/6633* (2013.01)

(58) Field of Classification Search
CPC .. C10M 115/08; C10M 133/20; C10M 105/38
USPC .................................................. 508/391, 528
See application file for complete search history.

(56) References Cited

U.S. PATENT DOCUMENTS

| | | | |
|---|---|---|---|
| 5,059,336 A | 10/1991 | Naka et al. | |
| 5,707,944 A * | 1/1998 | Yokouchi et al. | 508/485 |
| 6,417,143 B1 | 7/2002 | Mikami et al. | |
| 2005/0250653 A1 * | 11/2005 | Iso et al. | 508/276 |
| 2006/0068996 A1 | 3/2006 | Kuwabara et al. | |

(Continued)

FOREIGN PATENT DOCUMENTS

| | | |
|---|---|---|
| CN | 101636477 A | 1/2010 |
| EP | 0414191 A1 | 2/1991 |

(Continued)

OTHER PUBLICATIONS

Office Action/Search Report issued on Jul. 31, 2014, by the Chinese Patent Office in corresponding Chinese Patent Application No. 201280037460.0. (6 pages).

(Continued)

*Primary Examiner* — Prem C Singh
*Assistant Examiner* — Francis C Campanell
(74) *Attorney, Agent, or Firm* — Buchanan, Ingersoll & Rooney PC

(57) ABSTRACT

A grease composition for EV/HEV driving motor bearing, containing a diurea thickener of the following formula (A):

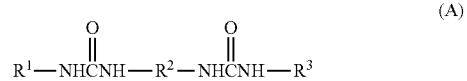

(A)

wherein $R^1$, $R^2$ and $R^3$ are defined, with the ratio of the number of moles of the straight-chain or branched alkyl group having 16 to 20 carbon atoms to the total number of moles of the cyclohexyl group and the straight-chain or branched alkyl group having 16 to 20 carbon atoms, expressed as [((the number of alkyl group)/(the number of cyclohexyl group+the number of alkyl group))×100] being 60 to 80%, and a base oil which has a kinematic viscosity at 40° C. of 15 to 50 mm$^2$/s and includes a trimethylolpropane ester oil in an amount of 80 mass % or more based on the total base oil mass. The grease composition can exhibit a long bearing lubrication life at high temperature and high speed, and satisfactory low-temperature flowability.

6 Claims, No Drawings

(56) References Cited

U.S. PATENT DOCUMENTS

2007/0173420 A1\* 7/2007 Iso .................................. 508/459
2007/0179066 A1\* 8/2007 Sakamoto et al. ............ 508/113
2010/0093567 A1 4/2010 Endo et al.
2012/0196781 A1 8/2012 Namiki et al.

FOREIGN PATENT DOCUMENTS

| JP | 1-259097 A | 10/1989 |
|----|------------|---------|
| JP | 3-079698 A | 4/1991 |
| JP | 2000-198993 A | 7/2000 |
| JP | 2009-1611 | 1/2009 |
| JP | 2010-001986 A | 1/2010 |
| JP | 2010-132746 A | 6/2010 |
| JP | 2011-084646 A | 4/2011 |

OTHER PUBLICATIONS

International Search Report (PCT/ISA/210) mailed on Oct. 30, 3012, by the Japanese Patent Office as the International Searching Authority for International Application No. PCT/JP2012/069165.
Written Opinion (PCT/ISA/237) mailed on Oct. 30, 2012, by the Japanese Patent Office as the International Searching Authority for International Application No. PCT/JP2012/069165.
Extended Search Report issued on Jun. 25, 2015, by the European Patent Office in corresponding European Patent Application No. 12817787 (7 pages).

\* cited by examiner

GREASE COMPOSITION FOR EV/HEV DRIVING MOTOR BEARING AND EV/HEV DRIVING MOTOR BEARING

TECHNICAL FIELD

The present invention relates to a grease composition for a driving motor bearing of electric vehicles (EV) and hybrid electric vehicles (HEV), and an EV/HEV driving motor bearing where the above-mentioned grease composition is enclosed.

BACKGROUND ART

The bearing for supporting a driving motor used in the EV and HEV is required to be operable within a wide temperature range because the bearing is used under various conditions, e.g., in low temperature atmospheres of cold regions and under the elevated temperature conditions due to running of the motor, transmission or reducer. In line with the rotation of bearing at higher speed resulting from higher output of the motor, the bearing is also required to have durability against high-speed rotation in order to improve the rotational performance.

In light of the operating conditions of high temperatures, the grease used for the bearings is required to have a long seizure life. The greases using mineral oil as a base oil and those using lithium soap as a thickener cannot meet the requirement of the seizure life under the high-temperature circumstances because of insufficient heat resistance of the base oil and the thickener.

To improve the seizure life under the high-temperature conditions, for example, JP 1-259097 A proposes a grease composition comprising an alkyldiphenyl ether oil as the essential ingredient, and a particular thickener. However, the above-mentioned grease composition cannot meet the low-temperature flowability because of high kinematic viscosity of the base oil.

For the purpose of satisfying the low-temperature flowability of the grease, it has been regarded as the usual measures to lower the kinematic viscosity of the employed base oil. For example, JP 2000-198993 A proposes a grease composition where a base oil contains an ester oil with a kinematic viscosity at 40° C. of 10 mm²/s or more. When the kinematic viscosity of the base oil is lowered, the low-temperature flowability can be satisfied, but the base oil exhibits poor heat resistance under the high temperature conditions, whereby satisfactory seizure life cannot be ensured.

SUMMARY OF INVENTION

Technical Problem

An object of the invention is to provide a grease composition for EV/HEV driving motor bearing, capable of ensuring a long bearing lubrication life under the conditions of high temperature and high speed, and low-temperature flowability.

Another object of the invention is to provide an EV/HEV driving motor bearing where the above-mentioned composition is enclosed.

Solution to Problem

The inventors of the invention have solved the problems of the bearing lubrication life under the conditions of high temperature and high speed and the low-temperature flowability by choosing a proper thickener and a proper base oil.

Namely, the invention provides a grease composition for EV/HEV driving motor bearing, and an EV/HEV driving motor bearing comprising the above-mentioned grease composition as shown below:

1. A grease composition for use in an EV/HEV driving motor bearing, comprising a thickener and a base oil, wherein the thickener is a diurea compound represented by the following formula (A):

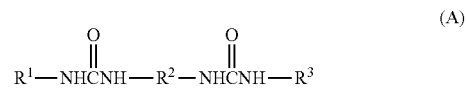

wherein $R^2$ is a bivalent aromatic hydrocarbon group having 6 to 15 carbon atoms; and $R^1$ and $R^3$, which may be the same or different represent a straight-chain or branched alkyl group having 16 to 20 carbon atoms or cyclohexyl group, with the ratio of the number of moles of the straight-chain or branched alkyl group having 16 to 20 carbon atoms to the total number of moles of the cyclohexyl group and the straight-chain or branched alkyl group having 16 to 20 carbon atoms, expressed as [((the number of alkyl group)/(the number of cyclohexyl group+the number of alkyl group))×100] being 60 to 80%, and the base oil comprises a trimethylolpropane ester oil in an amount of 80 mass % or more based on the total mass of the base oil and has a kinematic viscosity at 40° C. of 15 to 50 mm²/s.

2. The grease composition described in the above-mentioned item 1, wherein the trimethylolpropane ester oil is an ester of trimethylolpropane with a straight-chain or branched fatty acid having 6 to 14 carbon atoms.

3. The grease composition described in the above-mentioned item 1 or 2, wherein the thickener is a compound of formula (A) wherein one of $R^1$ or $R^3$ is a straight-chain or branched alkyl group having 18 carbon atoms and the other is cycloalkyl group.

4. The grease composition described in any one of the above-mentioned items 1 to 3, further comprising at least one antioxidant selected from the group consisting of amine-based antioxidants and phenol-based antioxidants.

5. The grease composition described in any one of the above-mentioned items 1 to 4, further comprising overbased metal sulfonate.

6. The grease composition described in any one of the above-mentioned items 1 to 5, having a worked penetration of 200 to 300.

7. A rolling bearing characterized by being operated at a dmn value of 1,000,000 or more, where the grease composition described in any one of the above-mentioned items 1 to 6 is enclosed.

Effects of Invention

The grease composition for EV/HEV driving motor bearing according to the invention can exhibit a long bearing lubrication life under the conditions of high temperature and high speed and excellent low-temperature flowability.

DESCRIPTION OF EMBODIMENTS

[Thickener]

The thickener used in the invention is represented by the following formula (A). This type of thickener can exhibit excellent heat resistance at high temperatures and excellent anti-leakage performance. Therefore, the grease composition of the invention can be provided with a long lubrication life under the conditions of high temperature and high speed.

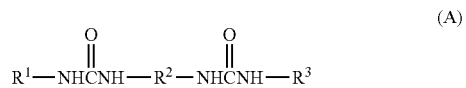

wherein $R^2$ is a bivalent aromatic hydrocarbon group having 6 to 15 carbon atoms. Representative examples of the group include those shown by the following structural formulas. In particular, the group shown in the middle is preferable.

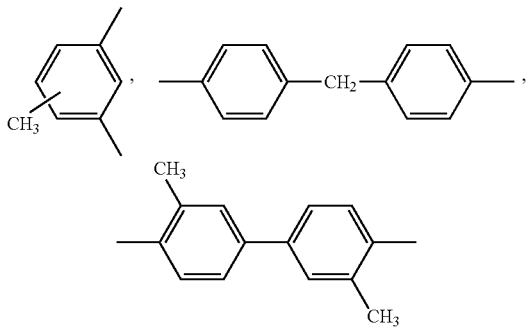

$R^1$ and $R^3$ represent cyclohexyl group or a straight-chain or branched alkyl group having 16 to 20 carbon atoms. As for the straight-chain or branched alkyl group, those having 18 carbon atoms are preferred. The ratio of the number of moles of the straight-chain or branched alkyl group having 16 to 20 carbon atoms to the total number of moles of the cyclohexyl group and the straight-chain or branched alkyl group having 16 to 20 carbon atoms, expressed as [((the number of straight-chain or branched $C_{16-20}$ alkyl group)/(the number of cyclohexyl group+the number of straight-chain or branched $C_{16-20}$ alkyl group))×100] is 60 to 80 mol %. The proportion of the straight-chain or branched $C_{16-20}$ alkyl group may be adjusted by changing the ratios of raw materials for constituting the thickener of formula (A).

When the molar ratio of the alkyl group is less than 60%, the flowability of the resultant grease will become low, so that a satisfactory lubrication life cannot be ensured under the high temperature conditions. When the molar ratio of the alkyl group exceeds 80%, grease leakage will increase along with the high-speed rotation, so that the satisfactory lubrication life cannot be obtained under the high temperature conditions.

The content of the thickener may appropriately be adjusted, but preferably in the range of 13 to 16% with respect to the total mass of the composition. Too much thickener will increase heat generation in the bearing although the leakage of grease can be reduced, whereby the long lubrication life cannot be ensured. On the other hand, too little thickener will increase the leakage of grease although the heat generation in the bearing can be reduced, so that the long lubrication life cannot be ensured, likewise.

[Base Oil]

The base oil used in the invention comprises a trimethylolpropane ester oil in an amount of 80 mass % or more with respect to the total mass of the base oil, and has a kinematic viscosity at 40° C. of 15 to 50 mm²/s. The above-mentioned kinematic viscosity at 40° C. may preferably be 15 to 40 mm²/s, and more preferably 15 to 30 mm²/s. When the kinematic viscosity at 40° C. is less than 15 mm²/s, the low-temperature flowability is satisfactory, but the heat resistance under the high temperature conditions will be inferior, with the result that the satisfactory lubrication life cannot be ensured. When the kinematic viscosity at 40° C. exceeds 50 mm²/s, the low-temperature flowability will be unsatisfactory although the heat resistance is excellent under high temperature conditions.

The base oil used in the grease composition of the invention is an ester type synthetic oil obtainable using trimethylolpropane as the alcohol. In this case, fatty acids for constituting the above-mentioned ester type synthetic oil include straight-chain or branched fatty acids having 6 to 14 carbon atoms, preferably 8 to 12 carbon atoms. The fatty acids may be used alone or two or more fatty acids may be used as a mixture. Use of the mixture of fatty acids is preferred. In particular, the mixture of a straight-chain fatty acid and a branched fatty acid is more preferable. The reason for this is that the straight-chain fatty acid can exhibit better low-temperature flowability when used together with the branched fatty acid than used alone. The fatty acid may be saturated or unsaturated, but saturated fatty acids may be preferable.

The base oil used in the invention comprises a trimethylolpropane ester oil in an amount of 80 mass % or more, preferably 90 mass % or more, and more preferably 100 mass %, based on the total mass of the base oil.

Any other base oil can be used together with the above-mentioned trimethylolpropane ester oil with no limitation so long as the resultant mixed base oil can be provided with a kinematic viscosity at 40° C. of 15 to 50 mm²/s, preferably 15 to 30 mm²/s. For example, diester, pentaerythritol ester oil, alkyldiphenyl ether oil, synthetic hydrocarbon oil and the like can be used.

[Additives]

The grease composition of the invention may further comprise any additives that can be usually used in the grease compositions for rolling bearings. Examples of the additives include an antioxidant such as amine-based antioxidants (e.g., diphenylamine and naphthylamine) and phenol-based antioxidants (e.g., hindered phenol antioxidants having no ester group, such as 2,6-di-tert-butyl-p-cresol and the like, and hindered phenol antioxidants having ester group, such as pentaerythrityl tetrakis[3-(3,5-di-t-butyl-4-hydroxyphenyl)propionate], octadecyl-3-(3,5-di-t-butyl-4-hydroxyphenyl) propionate and the like); a hardening inhibitor such as overbased metal sulfonate and the like; a rust preventive; a metallic corrosion inhibitor; an oiliness improver; an anti-wear agent; an extreme-pressure agent; a solid lubricant and the like. In particular, the antioxidant including the amine-based antioxidant and phenol-based antioxidant, and the hardening inhibitor of overbased metal sulfonate type may preferably be contained in the composition.

The contents of such additives may generally be 0.5 to 5.0 mass, based on the total mass of the grease composition according to the invention.

Particularly, it is preferable to use at least one antioxidant selected from the group consisting of amine-based antioxidants and at least one phenol-based antioxidant. As the amine-based antioxidant, diphenylamine is preferable; and as the phenol-based antioxidant, a hindered phenol having ester group is preferable. More preferably, at least one amine-based antioxidant and at least one phenol-based antioxidant may be contained. Most preferably, diphenylamine and a hindered phenol having ester group may be contained. When the antioxidant is contained, the total amount of the antioxidants may preferably be 2.0 to 3.0 mass % based on the total mass of the grease composition according to the invention.

It is also preferable to contain the overbased metal sulfonate type hardening inhibitor. The overbased metal sulfonate type hardening inhibitor may preferably have a total base number (TBN) of 50 to 500 mgKOH/g. Examples of the metal for the overbased metal sulfonate type hardening inhibitor include Ca, Na, Ba, Li, Zn, Pb, Mg and the like. Of those metals, Ca, Na and Mg are preferable, and Ca is most preferable. The TBN herein used is a value determined in accordance with the JIS K 2501. The overbased metal sulfonate type hardening inhibitor may preferably be contained in an amount of 0.05 to 1.0 mass % based on the total mass of the grease composition according to the invention when used.

[Worked Penetration]

The worked penetration of the grease composition according to the invention is preferably 200 to 300, more preferably 220 to 280. The worked penetration of more than 300 may often cause grease leakage at the time of high-speed rotation, so that the satisfactory lubrication life may not be obtained. On the other hand, the worked penetration of less than 200 will lower the greases flowability, which may result in unsatisfactory lubrication life.

The EV/HEV driving motor bearings where the grease composition of the invention is enclosed may include those that can be operated at a dmn value of 1,000,000 or more. The dmn value is a value expressing the bearing performance, determined according to the formula: $(D+d/2) \times n$ where D is a bearing outer diameter (mm), d is a bearing inner diameter (mm) and n is the number of revolutions (rpm).

EXAMPLES

[Preparation of Test Greases]

Grease compositions according to Examples and Comparative Examples were prepared using base oils shown below, and thickeners and additives as shown in Tables 1 and 2. To be more specific, diphenylmethane diisocyanate was reacted with one or more predetermined amines in each base oil, and the resultant mixture was heated and then cooled to obtain a base grease. The predetermined additives and base oil were added to each base grease, and the obtained mixture was kneaded using a three-roll mill to have a worked penetration of 190 to 310, whereby grease compositions according to Examples 1 to 12 and Comparative Examples 1 to 8 were obtained. The worked penetration was determined in accordance with the JIS K2220 7.

<Base Oils>

Ester oil A: trimethylolpropane ester oil with a kinematic viscosity at 40° C. of 19.7 mm²/s
Ester oil B: trimethylolpropane ester oil with a kinematic viscosity at 40° C. of 15.1 mm²/s
Ester oil C: trimethylolpropane ester oil with a kinematic viscosity at 40° C. of 74.9 mm²/s
Ester oil D: diester oil with a kinematic viscosity at 40° C. of 11.6 mm²/s
Ester oil E: pentaerythritol ester oil with a kinematic viscosity at 40° C. of 30.8 mm²/s
Ether oil: alkyldiphenyl ether oil with a kinematic viscosity at 40° C. of 97.0 mm²/s
Synthetic hydrocarbon oil: poly α-olefin with a kinematic viscosity at 40° C. of 30.5 mm²/s
Mineral oil: with a kinematic viscosity at 40° C. of 40.0 mm²/s The kinematic viscosity of each base oil at 40° C. was determined in accordance with JIS K 2220 23.

<Antioxidants>

Amine-based antioxidant A: diphenylamine
Amine-based antioxidant B: naphthylamine
Phenol-based antioxidant A: hindered phenol having ester group
Phenol-based antioxidant B: hindered phenol having no ester group The grease compositions thus prepared were subjected to the following tests.

<Test Methods>

(1) Bearing Lubrication Life Test

Each test grease composition was packed into a deep-groove ball bearing of non-contact rubber sealed type (with an inner diameter of 50 mm, an outer diameter of 90 mm and a width of 20 mm) so that 30% of the volume within the space of the bearing might be filled with the grease. The bearing was driven to continuously rotate under the conditions that the inner ring rotational speed was 14300 min$^{-1}$, the outer ring temperature was 120° C., and the radial load was 1000 N. The time taken for the outer ring temperature to be higher than the preset temperature by +10° C. was regarded as the seizure life time. The seizure life time was expressed as the relative value, assuming that the seizure life time of the grease in Comparative Example 1 was 1. The results are shown in Tables 1 and 2.

Evaluation oo: more than 3.0
o: more than 1.5 and 3.0 or less
x: 1.5 or less
The relative value of more than 1.5: acceptable
The relative value of 1.5 or less: not acceptable (2) Grease Leakage Test After rotation of the bearing was started under the test conditions mentioned above, the amount of leaking grease was determined 20 hours later. The grease leakage of 10 mass % or less was evaluated as acceptable.

Evaluation o: 10 mass % or less
x: more than 10 mass %
The grease leakage of 10 mass % or less: acceptable
The grease leakage of more than 10 mass %: not acceptable (3) Low-Temperature Flowability The low-temperature torque test was conducted at −40° C. in accordance with the JIS K2220 18. With the bearing being continuously rotated for 10 minutes, the rotational torque was obtained by calculating the average from the values of torque read during the last 15 seconds using a rotational torque meter. The rotational torque at low temperature was expressed as the relative value, assuming that the rotational torque obtained in Comparative Example 1 was 1. The results are shown in Tables 1 and 2.

Evaluation o: less than 1 x: 1 or more

The relative value of less than 1: acceptable

The relative value of 1 or more: not acceptable (3) Overall Evaluation o: when passing all of the tests including the bearing lubrication life test, grease leakage test, and low-temperature flowability test.

x: when not passing any one of the tests including the bearing lubrication life test, grease leakage test, and low-temperature flowability test.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|---|
| Thickener (molar ratio) | Diphenylmethane diisocyanate | | 50 | 50 | 50 | 50 | 50 | 50 | 50 | 50 | 50 | 50 | 50 | 50 |
| | Cyclohexylamine | | 30 | 40 | 20 | 30 | 30 | 30 | 30 | 30 | 30 | 30 | 30 | 30 |
| | Octadecylamine | | 70 | 60 | 80 | 70 | 70 | 70 | 70 | 70 | 70 | 70 | 70 | 70 |
| Base oil (mass %) | Ester oil A | | 100 | 100 | 100 | 100 | | 80 | 80 | 100 | 100 | 100 | 100 | 100 |
| | Ester oil B | | | | | | 100 | | | | | | | |
| | Ester oil C | | | | | | | | | | | | | |
| | Ester oil D | | | | | | | 20 | | | | | | |
| | Ester oil E | | | | | | | | | | | | | |
| | Ether oil | | | | | | | | | | | | | |
| | Synthetic hydrocarbon oil | | | | | | | | 20 | | | | | |
| | Mineral oil | | | | | | | | | | | | | |
| Additives (mass %) | Anti-oxidant | Amine type A | 1.5 | 1.5 | 1.5 | 1.5 | 1.5 | 1.5 | 1.5 | 1.5 | 1.5 | | | 1.5 |
| | | Amine type B | | | | | | | | | | | 1.5 | |
| | | Phenol type A | 1.2 | 1.2 | 1.2 | 1.2 | 1.2 | 1.2 | 1.2 | 1.2 | | 1.2 | 1.2 | |
| | | Phenol type B | | | | | | | | | | | | 1.2 |
| | Hardening inhibitor | Overbased Ca sulfonate | 0.2 | 0.2 | 0.2 | 0.2 | 0.2 | 0.2 | 0.2 | 0.2 | 0.2 | 0.2 | 0.2 | 0.2 |
| Content of thickener (mass %) | | | 15 | 16 | 16 | 11 | 15 | 15 | 15 | 13 | 15 | 15 | 15 | 15 |
| Kinematic viscosity of base oil (40° C.) mm²/s | | | 19.7 | 19.7 | 19.7 | 19.7 | 15.1 | 17.5 | 21.7 | 19.7 | 19.7 | 19.7 | 19.7 | 19.7 |
| Worked penetration | | | 235 | 235 | 235 | 295 | 235 | 235 | 235 | 280 | 235 | 235 | 235 | 235 |
| Bearing lubrication life | | | 3.3 | 2.7 | 2.9 | 1.9 | 2.5 | 2.6 | 3.0 | 3.2 | 2.4 | 1.9 | 2.8 | 2.5 |
| | | | oo | o | o | o | o | o | o | oo | o | o | o | o |
| Grease leakage | | | o | o | o | o | o | o | o | o | o | o | o | o |
| Low-temp. flowability | Low-temperature torque ratio | | 0.5 | 0.6 | 0.6 | 0.4 | 0.4 | 0.4 | 0.5 | 0.4 | 0.5 | 0.5 | 0.5 | 0.5 |
| | | | o | o | o | o | o | o | o | o | o | o | o | o |
| Overall evaluation | | | o | o | o | o | o | o | o | o | o | o | o | o |

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Thickener (molar ratio) | Diphenylmethane diisocyanate | | 50 | 50 | 50 | 50 | 50 | 50 | 50 | 50 |
| | Cyclohexylamine | | 100 | 50 | 10 | 30 | 30 | 30 | 30 | 30 |
| | Octadecylamine | | | 50 | 90 | 70 | 70 | 70 | 70 | 70 |
| Base oil (mass %) | Ester oil A | | | | 100 | 100 | | | | |
| | Ester oil B | | | | | | | | | |
| | Ester oil C | | | | | | 100 | | | |
| | Ester oil D | | | | | | | 100 | | |
| | Ester oil E | | | 100 | | | | | | |
| | Ether oil | | | | | | | | 100 | |
| | Synthetic hydrocarbon oil | | | | | | | | | 100 |
| | Mineral oil | | | | | | | | | 100 |
| Additives (mass %) | Antioxidant | Amine typeA | 1.5 | 1.5 | 1.5 | 1.5 | 1.5 | 1.5 | 1.5 | 1.5 |
| | | Amine typeB | | | | | | | | |
| | | Phenol typeA | 1.2 | 1.2 | 1.2 | 1.2 | 1.2 | 1.2 | 1.2 | 1.2 |
| | | Phenol typeB | | | | | | | | |
| | Hardening inhibitor | Overbased Ca sulfonate | 0.2 | 0.2 | 0.2 | 0.2 | 0.2 | 0.2 | 0.2 | 0.2 |
| Content of thickener (mass %) | | | 20 | 17 | 13 | 15 | 15 | 15 | 15 | 15 |
| Kinematic viscosity of base oil (40° C.) (mm²/s) | | | 30.8 | 19.7 | 19.7 | 74.9 | 11.6 | 97.0 | 30.5 | 40.0 |
| Worked penetration | | | 270 | 235 | 235 | 235 | 235 | 235 | 235 | 235 |
| Bearing lubrication life | | | 1.0 | 1.4 | 1.9 | 2.5 | 0.5 | 2.6 | 0.8 | 0.4 |
| | | | x | x | o | o | x | o | x | x |
| Grease leakage | | | o | o | x | o | o | o | o | o |
| Low-temp. flowability | Low-temperature torque ratio | | 1.0 | 0.8 | 0.7 | 1.7 | 0.3 | 1.9 | 0.8 | 2.5 |
| | | | x | o | o | x | o | x | o | x |
| Overall evaluation | | | x | x | x | x | x | x | x | x |

The bearing lubrication life, the grease leakage and the low-temperature flowability were all satisfactory in the grease compositions of Examples 1 to 12, while any one of the bearing lubrication life, grease leakage and low-temperature flowability was not satisfactory in Comparative Examples 1 to 8.

The invention claimed is:

1. A grease composition for use in an EV/HEV driving motor bearing, comprising a thickener and a base oil,
   wherein the thickener is a diurea compound represented by formula (A):

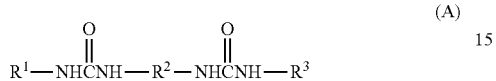

(A)

wherein $R^2$ is represented by the formula

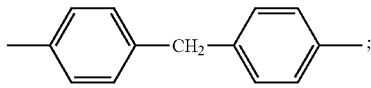

and $R^1$ and $R^3$, which may be the same or different represent a straight-chain or branched alkyl group having 16 to 20 carbon atoms or cyclohexyl group, with the ratio of the number of moles of the straight-chain or branched alkyl group having 16 to 20 carbon atoms to the total number of moles of the cyclohexyl group and the straight-chain or branched alkyl group having 16 to 20 carbon atoms, expressed as [((the number of alkyl group)/(the number of cyclohexyl group+the number of alkyl group))×100] being 60 to 80%; and the base oil comprises a trimethylolpropane ester oil in an amount of 80 mass % or more based on the total mass of the base oil and has a kinematic viscosity at 40° C. of 15 to 50 mm$^2$/s, wherein the trimethylolpropane ester oil is an ester of trimethylolpropane with two or more straight-chain or branched fatty acids having 8 to 12 carbon atoms, and the grease composition further comprises diphenylamine and hindered phenol-based antioxidants, the amount of the thickener is 11 to 16 mass % based on the total mass of the grease composition, and the total amount of the antioxidants is 2.0 to 3.0 mass % based on the total mass of the grease composition.

2. The grease composition of claim 1, wherein the thickener is a compound of formula (A) wherein one of $R^1$ or $R^3$ is a straight-chain or branched alkyl group having 18 carbon atoms and the other is cyclohexyl group.

3. The grease composition of claim 1, further comprising overbased metal sulfonate.

4. The grease composition of claim 1, having a worked penetration of 200 to 300.

5. A rolling bearing operated at a dmn value of 1,000,000 or more, where the grease composition of claim 1 is enclosed.

6. The grease composition of claim 1, wherein the amount of the base oil is at least 81 mass % based on the total mass of the grease composition.

* * * * *